J. BENNETT.
BEET HARVESTER.
APPLICATION FILED OCT. 3, 1908.
930,339.
Patented Aug. 10, 1909.
3 SHEETS—SHEET 1.
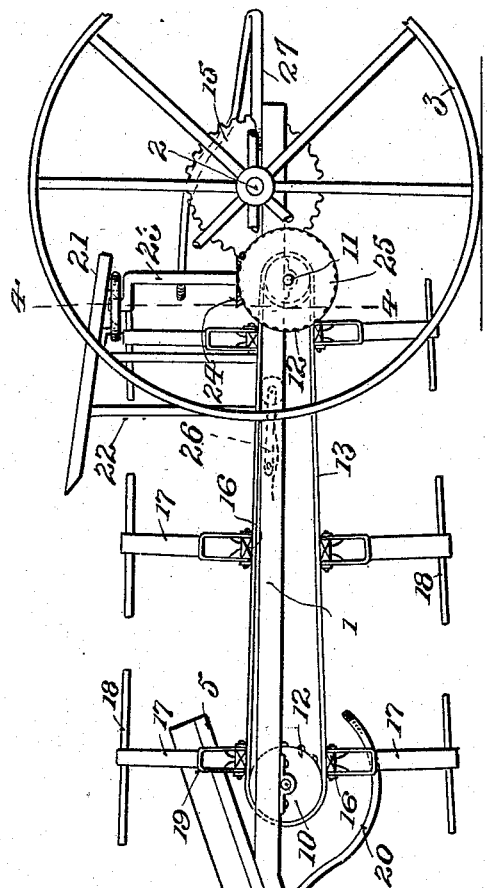
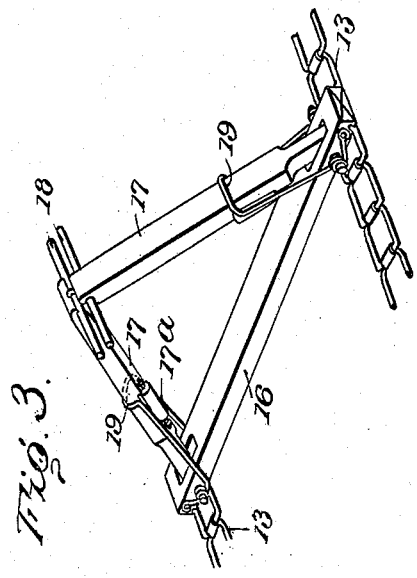

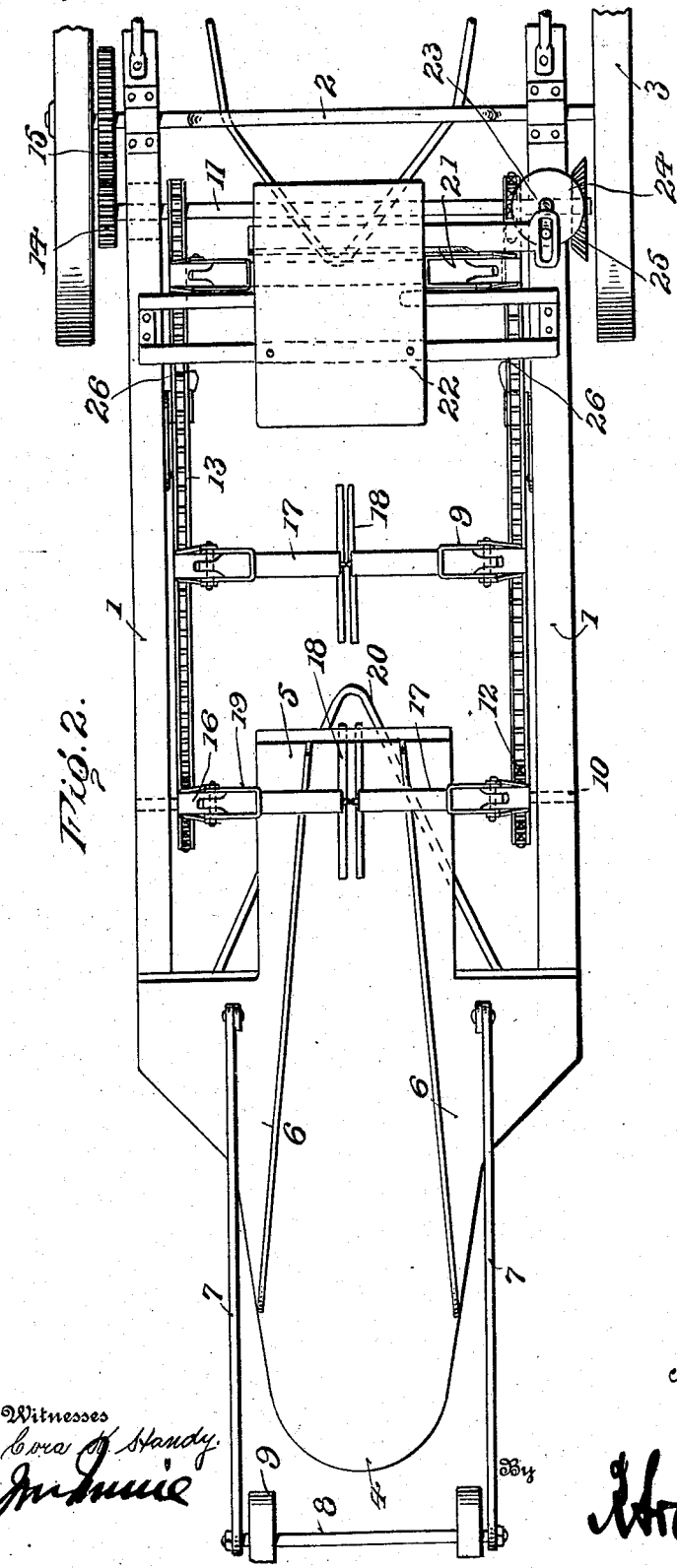

J. BENNETT.
BEET HARVESTER.
APPLICATION FILED OCT. 3, 1908.
930,339.
Patented Aug. 10, 1909.
3 SHEETS—SHEET 3.
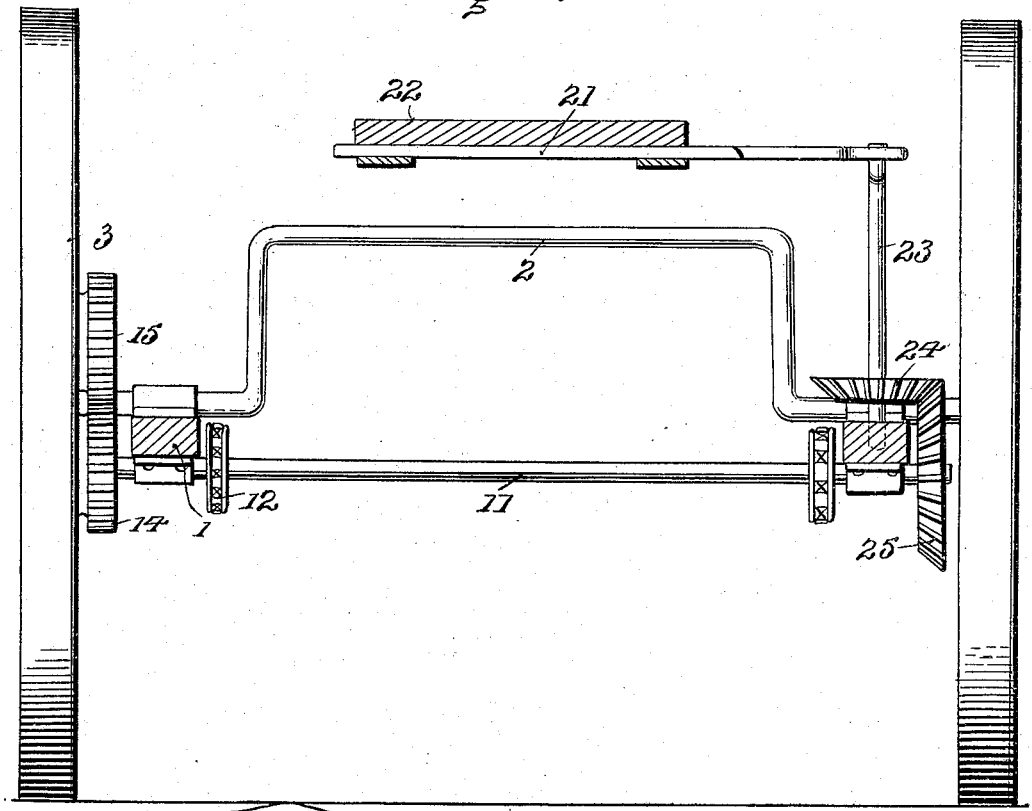
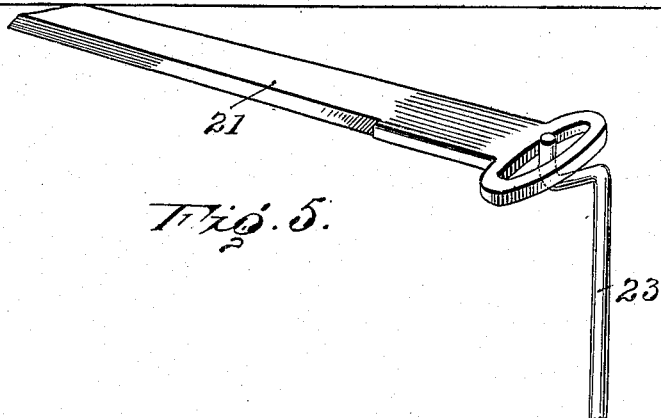

UNITED STATES PATENT OFFICE.

JOSEPH BENNETT, OF SHABBONA, MICHIGAN.

BEET-HARVESTER.

No. 930,339.  Specification of Letters Patent.  Patented Aug. 10, 1909.

Application filed October 3, 1908. Serial No. 455,985.

*To all whom it may concern:*

Be it known that I, JOSEPH BENNETT, citizen of the United States, residing at Shabbona, in the county of Sanilac and State of Michigan, have invented certain new and useful Improvements in Beet-Harvesters, of which the following is a specification.

The present invention relates to an improved beet harvesting machine and has for its primary object to provide a machine of this character which embodies novel means for excavating the beets, separating them from the dirt, and removing the tops therefrom.

The invention further contemplates a beet harvester which is simple and inexpensive in its construction and will operate in an effective manner to accomplish the desired result.

For a full understanding of the invention and the merits thereof and also to acquire a knowledge of the details of construction and the means for effecting the result, reference is to be had to the following description and accompanying drawings, in which:

Figure 1 is a side elevation of the improved beet harvesting machine. Fig. 2 is a top plan view of the same; Fig. 3 is a detail view of a portion of the beet carrying belt. Fig. 4 is a vertical sectional view on the line 4—4 of Fig. 1. Fig. 5 is a detail view of the beet topping knife.

Corresponding and like parts are referred to in the following description and indicated in all the views of the drawings by the same reference characters.

The main frame of the beet harvesting machine comprises a pair of longitudinally disposed bars 1 the rear ends of which are connected by an arched axle 2 having the wheels 3 journaled thereon, while the forward ends of the bars are connected by the digger 4. This digger is inclined downwardly and forwardly so as to pass under the beets and excavate the same, and terminates at its upper end in a narrow platform 5. A pair of rearwardly converging guide strips 6 are applied to the digger 4 and as the beets pass upwardly thereon serve to direct them toward the platform.

Projecting forwardly from the digger upon opposite sides thereof, are the curved beams 7 which are connected at their forward ends by a cross bar 8 upon which the wheels 9 are mounted. The draft for drawing the harvester across the field may be applied to this cross bar 8 in any suitable manner.

A front shaft 10 and a rear shaft 11 are journaled between the longitudinal bars 1 and are provided with the sprocket wheels 12 around which chains 13 are passed. One end of the rear shaft 11 projects outwardly upon one side of the main frame and is provided with a gear wheel 14 which meshes with a second gear wheel 15 rigidly applied to one of the rear wheels of the machine. With this construction it will be obvious that as the harvester is advanced across a field, motion will be transmitted to the chains or endless belts 13 through the medium of the gear wheels 14 and 15. The two chains 13 are connected at regular intervals by the cross bars 16 and pivotally mounted upon each of the cross bars is a pair of arms 17. A gripping bar 18 is carried by the swinging end of each of the arms, and springs 19 are utilized for swinging the arms 17 inwardly toward each other to cause the gripping bars 18 to engage the beets.

A spreader 20 projects downwardly from the upper end of the digger 4 and is designed to engage the arms 17 and force the same apart as they are moved forwardly upon the harvester. After the arms have thus been separated by the spreader they pass upwardly upon opposite sides of the platform 5 where they are released and swing together so that the gripping bars 18 engage the beets upon the platform and carry them rearwardly. While the beets are thus being carried to the rear end of the harvester, the dirt drops from the same and the tops are removed by a reciprocating knife 21 carried by a knife frame 22 projecting upwardly from the main frame. This knife is arranged over the path of the arms 17 and is connected at one end to the cranked portion of an upright shaft 23, the lower end of the said shaft being provided with a beveled gear wheel 24 which meshes with a similar gear wheel 25 upon the rear shaft 11. For the purpose of causing both small and large beets to be topped alike, belt tighteners 26 are utilized, the said belt tighteners being pivoted to the longitudinal bars 1 and being spring pressed upwardly against the chains 13 so as to cause all of the beets to bear against the top of the knife frame in the same manner. After the arms 17 have passed rearwardly under the knife frame and the tops have been removed from the beets, they engage a rear spreader 27, and are forced apart thereby so as to release the beets. It will thus be obvious that as the machine is advanced across a field, the beets will be excavated by the digger 4 and moved upwardly upon the platform 5 where they are gripped by the arms 17 and carried rearwardly under the beet topping knife 21. At the rear end of the frame, the arms are forced apart so as to release the beets and as they are again carried to the front of the frame they are separated by the forward spreader 20 previous to passing upwardly for engagement with the beets upon the platform.

Attention is directed to the fact that the inner faces of the arms 17 upon the beet carrying belt are provided with a roller 17$^a$, the said rollers engaging both the forward spreader 20 and the rear spreader 27 to reduce the friction and prevent any binding with the members when the machine is in operation.

Having thus described the invention, what is claimed as new is:

1. A device as specified comprising a frame, a shovel on said frame, a table formed upwardly upon said shovel to receive beets therefrom, an endless belt mounted on said frame longitudinally thereof, spring actuated arms carried by said belt for engaging beets therebetween delivered from said table and a knife mounted for reciprocation transversely on the rear end of said frame for engagement with the beets carried by said arms to top the same.

2. A device as specified comprising a frame, a shovel carried by said frame for forming a furrow and raising the earth from the same, a table rearwardly extended from said shovel to receive the earth, an endless belt carried longitudinally on said frame, outwardly extended arms carried by said belt, springs disposed on said belt and said arms for tensionally holding said arms inwardly to engage beets from said table, means carried by said frame for actuating said belt and a knife mounted for reciprocation on said frame in the rear end thereof for engagement with the beets carried by said spring arms.

3. A device as specified comprising a frame, a shovel disposed on said frame and extended forwardly and downwardly therefrom, an endless belt longitudinally disposed on said frame, a table carried by said frame and connected to said shovel, spring actuated arms disposed on said endless belt adapted to engage beets from said table, a beet topping mechanism disposed rearwardly on said frame for engaging the tops of beets carried by said arms, and means for actuating said endless belt.

4. A harvester as specified comprising a frame, an endless belt mounted on said frame, a plurality of spring actuated arms carried by said frame and adapted to lie inwardly, spreaders carried by said frame in the opposite ends thereof for engagement between said arms to diverge the same upon the reception and the delivery of beets relative to the same.

In testimony whereof I affix my signature in presence of two witnesses.

JOSEPH BENNETT. [L. S.]

Witnesses:
 EARL HARTWICK,
 JOHN JACKSON.